Oct. 7, 1924.

D. E. ROSS

LEVER

Filed Sept. 21, 1923

1,510,501

Inventor
David E. Ross
By Alexander Powell
Attorneys

Patented Oct. 7, 1924.

1,510,501

UNITED STATES PATENT OFFICE.

DAVID E. ROSS, OF LA FAYETTE, INDIANA, ASSIGNOR TO ROSS GEAR & TOOL COMPANY, OF LA FAYETTE, INDIANA, A CORPORATION OF INDIANA.

LEVER.

Application filed September 21, 1923. Serial No. 663,954.

*To all whom it may concern:*

Be it known that I, DAVID E. ROSS, a citizen of the United States, residing at La Fayette, in the county of Tippecanoe and State of Indiana, have invented certain new and useful Improvements in Levers; and I hereby declare that the following is a full, clear, and exact description thereof, reference being had to the accompanying drawings, which form part of this specification.

This invention is a novel improvement in levers as is particularly designed for use in place of the usual forged, or cast metal control levers on the rocker shafts of automobile steering gears, but may be used for any other desired purposes, and the principal object of the invention is to provide a novel lever, made from a stamping of sheet metal which may be manufactured at low cost, in a minimum of operations, and will be of less weight and capable of withstanding more stress than the usual forged, or cast metal lever.

Another object of the invention is to provide a novel control lever, made from a sheet metal stamping, which lever is designed to partially envelop the rocker tube or shaft, and provided with novel means whereby the lever may be caused to rigidly clamp the tube or shaft to prevent the lever from turning relatively to the tube or shaft.

I will explain the invention with reference to the accompanying drawings which illustrate one practical embodiment thereof to enable others to adopt and use the same, and will summarize in the claims the novel features of construction and novel combinations of parts, for which protection is desired.

Figure 1:
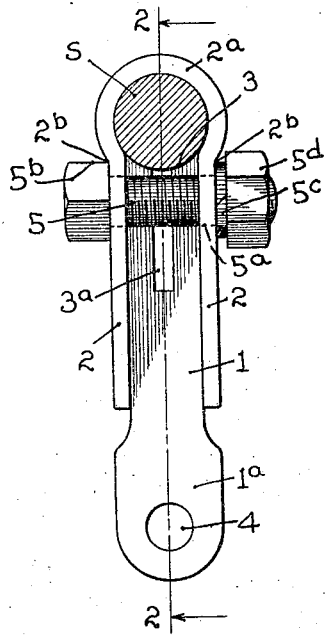
Fig. 1 is an elevation of my novel lever showing same mounted on a shaft.
Figure 2:
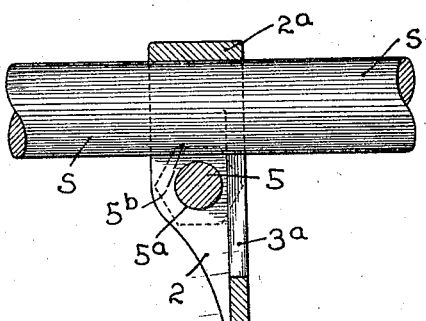
Fig. 2 is a vertical section through the lever on the line 2—2, Fig. 1.

Referring to the drawings, my novel lever is preferably made from a substantially triangular-shaped sheet metal stamping A, having a semi-circular portion A' integral with and extending from the base of said triangular portion A, said semi-circular portion A' being of substantially the same diameter as the length of the base of portion A. The apex of said triangular portion A is preferably extended as at $A^2$ to suit the desired length of the lever, said extension $A^2$ being preferably substantially rectangular in shape and of slightly less width than the diameter of the shaft to which the lever is to be applied and the free end thereof is preferably rounded, as shown. The sides of said triangular portion A are preferably slightly concaved, as shown at $A^3$, adjacent the portion $A^2$, but may if desired be of any other desired contour.

Figure 3:
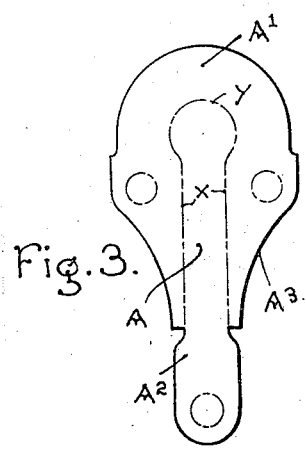
Fig. 3 is a plan view of a sheet metal stamping, from which the lever is formed.
Figure 4:
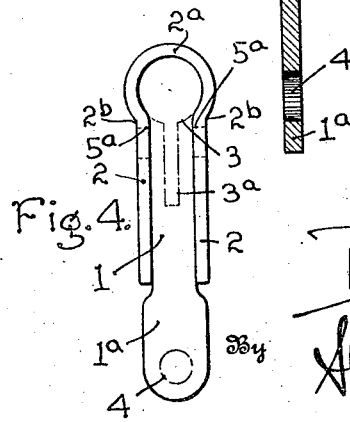
Fig. 4 is a plan view of the sheet metal blank shown in Fig. 3, showing the edges thereof flanged upwardly on the dot and dash line $x$—$y$ Fig. 3, and showing in dot and dash lines the locations of the bores and the slot.

Both side edges of the triangular portion A are bent upwardly in any desired manner, along the dash and dot lines X, shown in Fig. 3, said dot and dash lines X, preferably extending parallel with and are preferably continuations of the side edges of the extension $A^2$, so that when the side edges of the portion A are so bent upwardly the stamping is given a substantially trough-like shape, with the sides of the trough lessening in depth towards, and disappearing at, the extension $A^2$.

Also, the outer edges of the semi-circular portion A' are bent upwardly along the circular line Y, shown in Fig. 3, said circular line being preferably disposed at the center of the semi-circular portion A', is preferably one-thousandth of an inch less in diameter than the diameter of the shaft to which the lever is to be applied, and is preferably of slightly greater diameter than the width between the lines X. Circular line Y is preferably joined to the lines X at the points of intersection thereof with lines X, and hence when the edges of the portions A and A' are bent upwardly as above described the trough shaped stamping is provided on its upper end with a circular flange integral with the side flanges of the trough, said circular flange being of slightly greater diameter than the distance between the parallel side flanges, said circular flange being of slightly less diameter than the diameter of the shaft to which the lever is applied, and the connections between the circular and side flanges will form angles for the purposes hereinafter described.

When the stamping has been flanged as above described, the same will form a lever having a body portion 1, parallel side flanges 2, lessening in depth and disappearing towards the lower end 1ª of the body portion 1, and the upper end of the body 1 will be provided with a circular flange 2ª, integral with the flanges 2 and body portion 1, flange 2ª being of slightly less diameter than the diameter of the shaft S to which the lever is to be applied, and the connections between the circular flange 2ª with the parallel flanges 2 forming angles or corners 2ᵇ.

A bore 3 adapted to receive a shaft S to which the lever is to be applied is cut in the body 1 of the lever concentric with and of same diameter as the inside diameter of the circular flange 2ª, thereby entirely cutting away the body 1 of the lever at the top end thereof adjacent the circular flange 2ª and leaving only the circular flange 2ª which is adapted to fit around the shaft and preferably extends more than 180° around the shafts due to the fact that the distance between flanges 2 is made less than the diameter of the circular flange 2ª and bore 2.

Preferably a slot 3ª is cut in the body portion 1 extending from a point within the body to the bore 3 in order to permit the circular flange 2ª to be contracted or clamped around the shaft S by drawing together the adjacent ends of the flanges 2. Preferably the lower end 1ª of body 1 is provided with a bore 4, adapted to receive the coupling means of a suitable connecting link or the like.

The means for drawing the adjacent ends of the flanges 2 together to contract the circular flange 2ª around the shaft S preferably comprises a hexagon or square headed bolt 5 which passes through aligned holes 5ª in the upper ends of flanges 2, the axis of said holes 5ª being disposed slightly below the lower periphery of shaft S, so that when bolt 5 is passed therethrough one flat side 5ᵇ of the hexagon or square head of the bolt 5 will lie in or against the corner 2ᵇ formed by the connection of side flange 2 with circular flange 2ª, as shown, to prevent said bolt from turning as the nut therein is tightened. A suitable lock washer 5ᶜ is preferably inserted between the nut 5ᵈ and opposite side flange 2, so as to allow the nut to rotate on the bolt 5 without binding against the periphery of circular flange 2ª, and to prevent backward rotation of said nut.

When the lever is applied to shaft S, but tightening up on the nut 5ᵇ, the flanges 2 will be drawn together adjacent slot 3ª, to bind or contract the circular flange 2ª around said shaft S and prevent relative rotation of the lever on said shaft S.

My lever provides a novel and efficient control lever made from sheet metal stamping, which may be made at low cost, in a minimum of operations, and is stronger and will withstand more stress than the usual cast metal or forged levers, and my novel clamping means prevents the lever from rotating relatively to the shaft.

I claim:—

1. A lever of sheet metal, comprising a substantially trough-shaped body portion, an arc-shaped flange of greater diameter than the width of the body portion connecting the adjacent ends of the side member of said body portion, and adapted to fit around a shaft, and means for drawing said side members of the body together to contract the arc-shaped flange around the shaft.

2. A lever of sheet metal, comprising a substantially trough-shaped body portion, an arc-shaped flange of greater diameter than the width of the body portion connecting the adjacent ends of the side members of said body portion and adapted to fit around a shaft, and means for contracting the arc-shaped flange around the shaft, said means comprising a bolt passing through the side members adjacent the arc-shaped flange, and adapted to draw said side members together.

3. A lever of sheet metal, comprising a stamping having its edges bent upwardly to form a substantially trough-shaped body having parallel side flanges and having an arc-shaped flange of greater diameter than the width of said body connecting the adjacent ends of said side flanges and adapted to fit around a shaft; a bore in said body for the passage of said shaft concentric with the arc-shaped flange, and means for drawing said side flanges together to contract the arc-shaped flange around the shaft.

4. A lever comprising a sheet metal stamping bent to form a substantially trough-shaped body having a base with parallel side flanges and having an arc-shaped flange of more than 180° in circumference connecting the adjacent ends of the side flanges, a bore in said base adapted to receive a shaft, said bore being concentric with the arc-shaped flange, a slot on the axis of said base extending from a point within the base to said bore; and means for drawing said side flanges together to contract the arc-shaped flange around the shaft.

5. In a lever as set forth in claim 4, said side flanges diminishing in depth towards the outer free end of said lever, and coupling means on the outer free end of said lever.

6. A lever comprising a sheet metal stamping bent to form a substantially trough-shaped body having a base with parallel side flanges and having an arc-shaped flange of more than 180° in circumference connecting the adjacent ends of the side flanges, the diameter of the arc-shaped flange being greater than the distance between side flanges, thereby forming corners at the intersections of the arc-shaped and side flanges a bore in said base adapted to receive a shaft, said bore being concentric with the arc-shaped flange, a slot on the axis of said bore extending from a point within the base to said bore; and means for drawing the side flanges together to contract the arc-shaped flange around the shaft.

7. In a lever as set forth in claim 6, said means comprising a bolt passing through aligned apertures in said side flanges adjacent the arc-shaped flange, said bolt being so disposed that the straight edge of one side of said bolt head will lie in the corner formed at the intersection of the flange and the arc-shaped flange and a washer inserted between the nut and the opposite side flange to permit rotation of the nut past its adjacent corner.

8. In a lever as set forth in claim 6, the side flanges diminishing in depth towards the outer free end of said lever, and coupling means on the outer free end of said lever.

9. A lever of the character specified comprising a substantially triangular shaped sheet metal stamping having a semicircular extension integral with its base, and a substantially rectangular extension at the apex thereof, said stamping being bent to form a substantially trough-shaped body having a base with parallel side flanges and having an arc-shaped flange of more than 180° in circumference connecting the adjacent ends of the side flanges, the diameter of the arc-shaped flange being greater than the distance between side flanges, thereby forming corners at the intersections of the arc-shaped and side flanges a bore in said base adapted to receive a shaft, said bore being concentric with and of same diameter as the interior diameter of the arc-shaped flange a slot on the axis of said bore extending from a point within the base to said bore and means for drawing the side flanges together to contract the arc-shaped flange around the shaft.

10. In a lever as set forth in claim 9, said means comprising a bolt passing through aligned apertures in said side flanges adjacent the arc-shaped flange, said bolt being so disposed that the straight edge of one side of the bolt head will lie in the corner formed by the intersection of one side flange and the arc-shaped flange to prevent rotation of the bolt, and a lock washer interposed between the nut and the opposite side flange to permit rotation of the nut past its adjacent corner.

11. In a lever as set forth in claim 9, the side flanges diminishing in depth towards the outer free end of said lever, and coupling means on the outer free end of said lever.

In testimony that I claim the foregoing as my own, I affix my signature.

DAVID E. ROSS.